(12) United States Patent
Theriot et al.

(10) Patent No.: US 7,895,134 B2
(45) Date of Patent: *Feb. 22, 2011

(54) SYSTEM TO FORM AN ACTUAL SALES OR DELIVERY VALUE FOR ALL COMPONENTS OF A COMMINGLED HYDROCARBON FLUID STREAM

(75) Inventors: William Joseph Theriot, Dickinson, TX (US); Mark Reese Brown, Pearland, TX (US); Joseph Edward Landes, Pearland, TX (US); William Jeffrey Wild, Friendswood, TX (US); Herman Reese Brown, Pearland, TX (US)

(73) Assignee: SPL, Inc., Pearland, TX (US)

( * ) Notice: Subject to any disclaimer, the term of this patent is extended or adjusted under 35 U.S.C. 154(b) by 141 days.

This patent is subject to a terminal disclaimer.

(21) Appl. No.: 12/410,022

(22) Filed: Mar. 24, 2009

(65) Prior Publication Data

US 2010/0250468 A1 Sep. 30, 2010

(51) Int. Cl.
*G06Q 99/00* (2006.01)
*G01N 22/04* (2006.01)

(52) U.S. Cl. .............. 705/400; 705/1.1; 705/7; 705/8; 705/37; 702/6; 166/308.1; 709/223

(58) Field of Classification Search .......... 705/1.1, 705/7–8, 10, 37–38, 400; 702/6; 709/223; 166/308.1
See application file for complete search history.

(56) References Cited

U.S. PATENT DOCUMENTS

| | | | | |
|---|---|---|---|---|
| 3,660,649 A | * | 5/1972 | Gilchrist et al. | 705/400 |
| 3,761,701 A | * | 9/1973 | Wilder et al. | 702/9 |
| 4,845,628 A | * | 7/1989 | Gray et al. | 702/9 |
| 7,051,807 B2 | * | 5/2006 | Vinegar et al. | 166/245 |
| 7,072,863 B1 | | 7/2006 | Phillips et al. | |
| 7,373,285 B2 | | 5/2008 | Webb | |
| 7,444,193 B2 | | 10/2008 | Cutler | |
| 7,636,671 B2 | * | 12/2009 | Caveny et al. | 705/10 |
| 7,676,420 B1 | * | 3/2010 | Agnew et al. | 705/37 |
| 2003/0004648 A1 | * | 1/2003 | Huffman et al. | 702/14 |
| 2005/0115711 A1 | * | 6/2005 | Williams et al. | 166/308.1 |
| 2005/0209912 A1 | * | 9/2005 | Veeningen et al. | 705/11 |
| 2006/0004593 A1 | * | 1/2006 | Seat et al. | 705/1 |
| 2006/0100943 A1 | * | 5/2006 | Bennett | 705/35 |
| 2007/0094368 A1 | * | 4/2007 | Erb et al. | 709/223 |

(Continued)

FOREIGN PATENT DOCUMENTS

GB 2146751 A * 4/1985

OTHER PUBLICATIONS

Ulrich, Carl W.; "Unbundling Natural Gas Sales Services- Is the FERC Throwing the Baby Out With the Bath Water?"; Oct. 13, 1988, Public Utilities Fortnightly, pp. 19-22.*

*Primary Examiner*—John W Hayes
*Assistant Examiner*—Freda A Nelson
(74) *Attorney, Agent, or Firm*—Buskop Law Group, PC; Wendy Buskop

(57) ABSTRACT

A system to form an actual sales value or actual delivery value for all components of a commingled hydrocarbon fluid stream using mass, volume and energy, to create a theoretical commingled hydrocarbon fluid stream molecular composition and present the information on individual components in the commingled hydrocarbon fluid stream instantaneously to a buyer and a seller.

19 Claims, 7 Drawing Sheets

U.S. PATENT DOCUMENTS

| | | | |
|---|---|---|---|
| 2008/0052097 A1* | 2/2008 | Bouzas et al. | 705/1 |
| 2008/0065445 A1* | 3/2008 | Livesay et al. | 705/7 |
| 2008/0091496 A1* | 4/2008 | Gurpinar et al. | 705/8 |
| 2008/0235155 A1* | 9/2008 | Thywissen | 705/400 |
| 2008/0306803 A1* | 12/2008 | Vaal et al. | 705/8 |
| 2009/0032249 A1* | 2/2009 | Morales et al. | 166/250.01 |
| 2009/0271233 A1* | 10/2009 | Prange et al. | 705/7 |
| 2009/0314487 A1* | 12/2009 | Medoff | 166/247 |
| 2010/0096129 A1* | 4/2010 | Hinkel et al. | 166/270.1 |
| 2010/0155078 A1* | 6/2010 | Walters et al. | 166/369 |

* cited by examiner

|  | Stream A | Stream B | Stream C |
|---|---|---|---|
| Quantity of Individual Hydrocarbon Streams |  | 526 | 603 | 5000 |

Molecular Composition of Individual Hydrocarbon Stream

|  | Stream A | Stream B | Stream C |
|---|---|---|---|
| N2 | 0.005199 | 0.0049 | 0.003 |
| CO2 | 0.0014 | 0.063594 | 0.0043 |
| C1 | 0.539646 | 0.727827 | 0.989999 |
| C2 | 0.016198 | 0.092791 | 0.0022 |
| C3 | 0.027497 | 0.038096 | 0.0003 |
| IC4 | 0.005199 | 0.007799 | 0.0001 |
| NC4 | 0.012399 | 0.011599 | 0.0001 |
| IC5 | 0.006799 | 0.0044 | 0 |
| NC5 | 0.008699 | 0.0037 | 0 |
| C6 | 0.024498 | 0.009999 | 0 |
| C7 | 0.019098 | 0.006499 | 0 |
| C8 | 0.022398 | 0.0047 | 0 |
| C9 | 0.017398 | 0.0023 | 0 |
| C10+ | 0.293571 | 0.021798 | 0 |
|  | 1 | 1 | 1 |

Tagging of Components with Component Identifiers

| | | |
|---|---|---|
| N2 | A-N2 | B-N2 | C-N2 |
| CO2 | A-CO2 | B-CO2 | C-CO2 |
| C1 | A-C1 | B-C1 | C-C1 |
| C2 | A-C2 | B-C2 | C-C2 |
| C3 | A-C3 | B-C3 | C-C3 |
| IC4 | A-IC4 | B-IC4 | C-IC4 |
| NC4 | A-NC4 | B-NC4 | C-NC4 |
| IC5 | A-IC5 | B-IC5 | C-IC5 |
| NC5 | A-NC5 | B-NC5 | C-NC5 |
| C6 | A-C6 | B-C6 | C-C6 |
| C7 | A-C7 | B-C7 | C-C7 |
| C8 | A-C8 | B-C8 | C-C8 |
| C9 | A-C9 | B-C9 | C-C9 |
| C10+ | A-C10 | B-C10 | C-C10 |

FIGURE 1

Commingling of Tagged Components

| | | Molecular Composition | Quantity of Tagged Components |
|---|---|---|---|
| Total Quantity of All | | | 6,129 |
| Tagged Commingled Stream | A-N2 | 0.000446284 | 2.74 |
| | A-CO2 | 0.000120153 | 0.74 |
| | A-C1 | 0.046319142 | 283.89 |
| | A-C2 | 0.001390347 | 8.52 |
| | A-C3 | 0.002360156 | 14.47 |
| | A-IC4 | 0.000446284 | 2.74 |
| | A-NC4 | 0.001064216 | 6.52 |
| | A-IC5 | 0.000583602 | 3.58 |
| | A-NC5 | 0.000746668 | 4.58 |
| | A-C6 | 0.002102685 | 12.89 |
| | A-C7 | 0.001639236 | 10.05 |
| | A-C8 | 0.001922455 | 11.78 |
| | A-C9 | 0.001493335 | 9.15 |
| | A-C10 | 0.025197888 | 154.44 |
| | B-N2 | 0.000482346 | 2.96 |
| | B-CO2 | 0.006260658 | 38.37 |
| | B-C1 | 0.071653029 | 439.16 |
| | B-C2 | 0.009135048 | 55.99 |
| | B-C3 | 0.003750488 | 22.99 |
| | B-IC4 | 0.000767816 | 4.71 |
| | B-NC4 | 0.001141881 | 7.00 |
| | B-IC5 | 0.000433127 | 2.65 |
| | B-NC5 | 0.000364221 | 2.23 |
| | B-C6 | 0.00098438 | 6.03 |
| | B-C7 | 0.000639847 | 3.92 |
| | B-C8 | 0.000462659 | 2.84 |
| | B-C9 | 0.000226407 | 1.39 |
| | B-C10 | 0.002145949 | 13.15 |
| | C-N2 | 0.002447404 | 15.00 |
| | C-CO2 | 0.003507945 | 21.50 |
| | C-C1 | 0.80756168 | 4,949.55 |
| | C-C2 | 0.001794763 | 11.00 |
| | C-C3 | 0.00024474 | 1.50 |
| | C-IC4 | 8.15801E-05 | 0.50 |
| | C-NC4 | 8.15801E-05 | 0.50 |
| | C-IC5 | 0 | - |
| | C-NC5 | 0 | - |
| | C-C6 | 0 | - |
| | C-C7 | 0 | - |
| | C-C8 | 0 | - |
| | C-C9 | 0 | - |
| | C-C10 | 0 | - |
| | | 1.00E+00 | 6,129.00 |

FIGURE 4

Proration of Theoretical Tagged Commingled Stream

| | | Stream A | Stream B | Stream C | Total Theoretical per Component |
|---|---|---|---|---|---|
| Theoretical Quantity per Stream | N2 | 2.74 | 2.96 | 15.00 | 20.69 |
| | CO2 | 0.74 | 38.26 | 21.44 | 60.43 |
| | C1 | 283.86 | 439.11 | 4948.94 | 5671.90 |
| | C2 | 8.49 | 55.76 | 10.96 | 75.20 |
| | C3 | 14.01 | 22.26 | 1.45 | 37.71 |
| | IC4 | 2.43 | 4.19 | 0.45 | 7.07 |
| | NC4 | 5.47 | 5.86 | 0.42 | 11.74 |
| | IC5 | 2.27 | 1.67 | 0.00 | 3.94 |
| | NC5 | 2.56 | 1.25 | 0.00 | 3.81 |
| | C6 | 3.56 | 1.69 | 0.00 | 5.24 |
| | C7 | 1.23 | 0.48 | 0.00 | 1.71 |
| | C8 | 0.60 | 0.15 | 0.00 | 0.75 |
| | C9 | 0.19 | 0.03 | 0.00 | 0.22 |
| | C10+ | 0.16 | 0.02 | 0.00 | 0.18 |
| | | 328.29 | 573.66 | 4998.65 | 5900.60 |

| | | | | | Total Delivery |
|---|---|---|---|---|---|
| Proration of Actual Sales or Delivery | N2 | 2.80 | 3.03 | 15.37 | 21.20 |
| | CO2 | 0.73 | 38.05 | 21.32 | 60.10 |
| | C1 | 290.39 | 449.21 | 5062.80 | 5802.40 |
| | C2 | 8.62 | 56.65 | 11.13 | 76.40 |
| | C3 | 14.93 | 23.72 | 1.55 | 40.20 |
| | IC4 | 2.93 | 5.04 | 0.54 | 8.50 |
| | NC4 | 4.89 | 5.24 | 0.37 | 10.50 |
| | IC5 | 2.60 | 1.90 | 0.00 | 4.50 |
| | NC5 | 2.49 | 1.21 | 0.00 | 3.70 |
| | C6 | 3.94 | 1.86 | 0.00 | 5.80 |
| | C7 | 0.86 | 0.34 | 0.00 | 1.20 |
| | C8 | 0.40 | 0.10 | 0.00 | 0.50 |
| | C9 | 0.35 | 0.05 | 0.00 | 0.40 |
| | C10+ | 0.26 | 0.04 | 0.00 | 0.30 |
| Total Quantity of Delivery | | 336.18 | 586.44 | 5113.08 | 6035.70 |

FIGURE 5

SYSTEM TO FORM AN ACTUAL SALES OR DELIVERY VALUE FOR ALL COMPONENTS OF A COMMINGLED HYDROCARBON FLUID STREAM

FIELD

The present embodiments generally relate to a system to form an actual sales value or actual delivery value for all components of a commingled hydrocarbon fluid stream and present that information simultaneously to a buyer and a seller using a theoretical commingled stream molecular composition.

BACKGROUND

A need exists for individual suppliers of hydrocarbon fluid streams before processing to be paid precisely for the precise molecules after processing even if individual suppliers hydrocarbon fluid streams are commingled during processing and individual molecules experience one or more phase changes.

A further need exists for an easy way to conclude transactions based on true molecular content of a stream that can be handled using an executive dashboard for continual monitoring of the system and the final transactions.

A need exists for an equitable method for allocating commingled production streams. Current methods ignore the energy transfer from one production stream to another production stream. This method fully accounts for the energy transfer of all components for all production sources in a commingled stream.

A further need exists to identify the value differential due to the effects of commingling production streams.

It is possible for a production stream to loose or gain value by the commingling effect. The same is true for natural gas streams. Pressure, temperature, and volume throughout the pipeline or the process can either cause an injected stream to loose or gain value which can hurt a seller or hurt a buyer (depending on the gain or loss).

The present embodiments meet these needs.

BRIEF DESCRIPTION OF THE DRAWINGS

The detailed description will be better understood in conjunction with the accompanying drawings as follows:

FIG. 1 depicts molecular compositions determined using the system from hydrocarbon samples of hydrocarbon fluid streams.

FIG. 4 shows a theoretical commingled hydrocarbon fluid stream molecular composition.

FIG. 5 shows the pro-rated molecules ending up as actual sales values and actual delivery values for commodities analyzed using the system.

Figure 2:
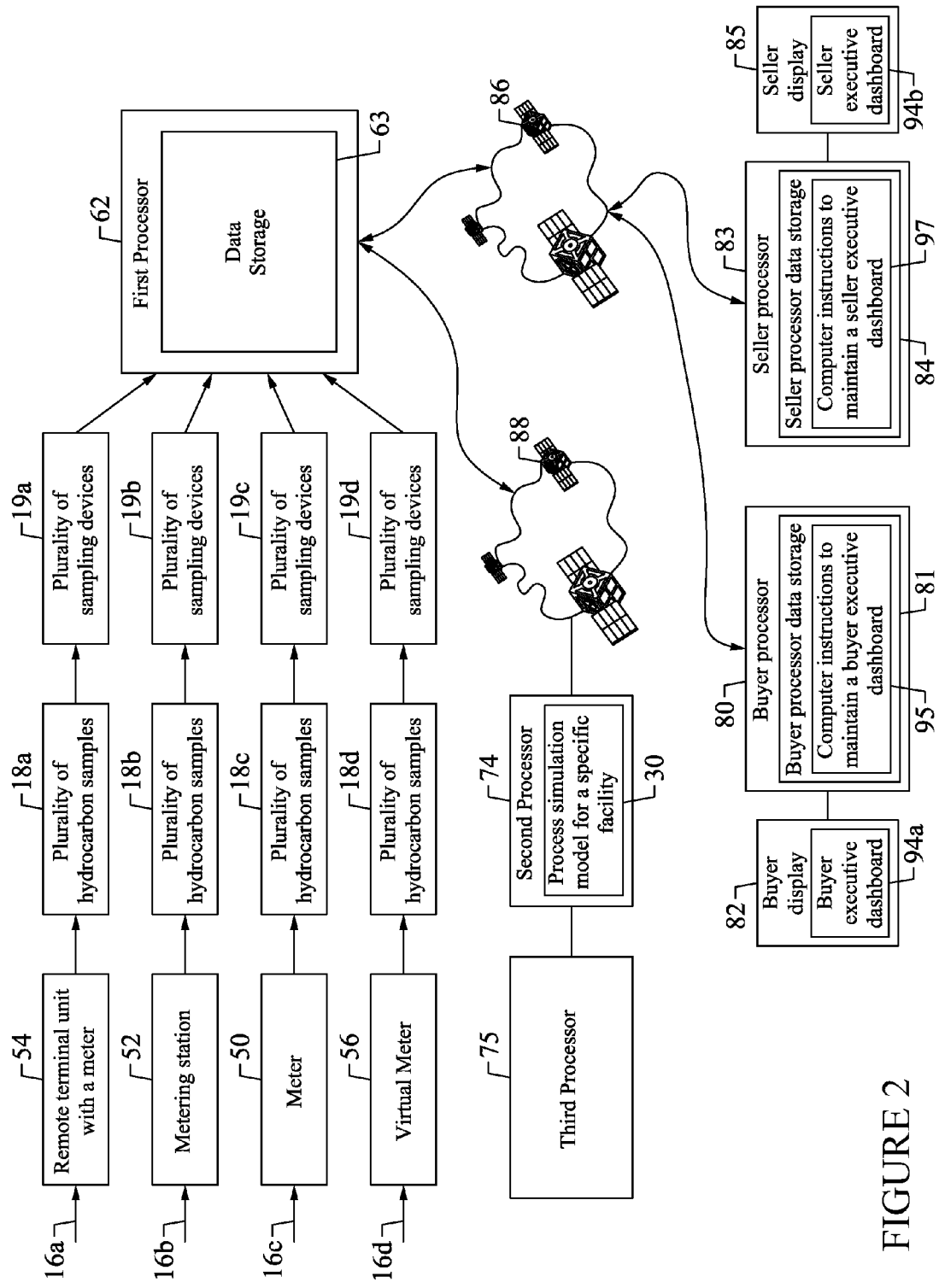
FIG. 2 is a diagram of the system usable with the embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system to determine an actual sales value or actual delivery value for all commodities of a commingled hydrocarbon fluid stream using a theoretical commingled hydrocarbon fluid stream molecular composition.

The term "hydrocarbon fluid stream" as used herein can refer to a source of hydrocarbon fluid, from a process or a well and can be named for an offshore production facility from which the hydrocarbon stream originates, such as, a well head, a spar, a tension leg platform, a semisubmersible, a jack up rig, a barge, another floating vessel, a subsea tie back, or an onshore geophysical source such as Midland, Tex.'s Permian basin zone 23-4, and can include a multiphase fluid.

The term "process simulation model" which is also referred to as "PSM" can be a software program, a group of computer instructions that direct a processor to perform a series of analytical steps. Process simulation models that are usable herein can include those made and commercially sold by Aspen Technology of Houston, Tex. and are known as "Hysis". Other usable PSM can be those sold by Virtual Materials Group of Calgary, Canada such as the "VGM Sim". Still other usable PSM can be those offered by Bryan Research and Engineering of Bryan, Tex. and are known as "Promax" or "ProSim". Still other usable PSM in the embodiments can include PSM known as "Unisym" which is offered by Honeywell Process Solutions of Houston, Tex. Still other usable PSM in the embodiments can include PSM known as "OLGA", which is offered by SPT Group of Kjeller Norway.

The term "actual sales value" can refer to the monetary value of all commodities of the hydrocarbon fluid stream at the custody transfer point in barrels, in cubic feet, MMBTU, or similar units.

The term "actual delivery value" can refer to the monetary value of all commodities of the hydrocarbon fluid stream at the delivery point in barrels, in cubic feet, MMBTU, or similar units.

The term "commodities" can refer to one or more commingled commodities, which can be a crude oil, a condensate, a natural gas, a liquefied natural gas, a liquefied petroleum gas, fractionated fluids, gas plant raw make, such as Y grade liquid, or combinations thereof.

A "commingled hydrocarbon fluid stream" can refer to hydrocarbon fluids from at least two sources, like two different wells each having a different owner or owners. The commingled hydrocarbon fluid streams can be introduced to a facility, such as a refinery, an offshore or onshore production gathering system, an offshore production facility, or a subsea well hub that processes the actual molecules of the hydrocarbon stream. The individual molecules can have a sales price associated with those molecules, by component, such as methane. The molecules of the commingled hydrocarbon fluid stream can go through no phase change, one or more phase changes, or a partial phase change as they pass though a facility.

An embodiment of the invention can enable an owner of a well to understand the processing steps of the owner's molecules as they pass through a specified facility and it can enable the owner to be paid on all of the owner's molecules regardless of the phase changes experienced by the molecules.

An embodiment of the invention provides a predictive system that enables a buyer to see multiple molecules to be acquired by the owner and the various locations of those molecules even though the molecules are in the midst of a phase change.

The embodiments can provide a predictive model on component mass, component volume and component energy for molecules of a commingled hydrocarbon fluid stream.

The embodiments can provide an accurate system for paying an owner on the actual molecules processed from their well, while the molecules are in fact commingled with the molecules of fluids of other owners. In other systems, owners are paid on "aggregates" not true numbers of molecules.

An embodiment can provide a predictive model that can be continually monitored using an executive dashboard and results can be pushed to individual client devices over at least one network.

The system can include a first processor having a first processor data storage. Computer instructions can be in the first processor data storage, which can instruct the first processor to determine a mass, a volume, an energy, or combinations of mass, volume and energy for each of at least two different hydrocarbon fluid streams.

To determine mass of one of the hydrocarbon fluid stream, either a direct mass measurement by a mass flow meter can be used, such as those made by Micromotion of Boulder, Colo. or and inferred mass can be determined using a volumetric meter, such as one made by Daniels, of Houston, Tex. Mass can be determined using a densitometer, such as those made by Fluid Dynamics of Rosemont, N.J.

To determine a volume for one of the hydrocarbon fluid streams, a volumetric flow meter can be used, such as one from Omni Flow Computer of Stafford, Tex.

To determine an energy for at least one of the hydrocarbon fluid streams, a combination of a volumetric flow meter analysis combined with analysis using a chromatograph.

As an example, the mass of a first hydrocarbon fluid stream, (termed herein a Example A hydrocarbon stream) which is a condensate would be the amount of pounds that 100 barrels of condensate weights, 2300 pounds. Similarly, the volume of that Example A of 100 barrels would be 4200 gallons. Additionally, the energy for that 100 barrels of the condensate of Example A would be 115 mmbtu of energy.

The first data storage can include computer instructions, which can instruct the first processor to obtain a hydrocarbon sample from a plurality of sampling devices, wherein each sampling device can be associated with a hydrocarbon fluid stream. Each hydrocarbon sample can be representative of each of the plurality of hydrocarbon fluid streams to be processed in a specified facility.

For example, a first sample from the Example A hydrocarbon fluid stream can be 500 cc of the commodity, while for a different hydrocarbon fluid stream, referred to herein as Example B hydrocarbon fluid stream, can be 1000 cc of a different commodity.

Each sample can be pulled from each hydrocarbon fluid streams by a continuous sampling system, a batch sampling system or another spot sampling system. An example of one of these sampling systems can be a YZ-3010 sampling system made by YZ Industries of Houston, Tex.

The hydrocarbon fluid streams can be one or more commodity. The commodities can be a crude oil, a condensate, a natural gas, a liquefied natural gas, a liquefied petroleum gas, fractionated fluids, gas plant raw make, such as Y grade liquid, or combinations thereof.

The first processor can be directed by additional computer instructions, which can determine a plurality of molecular compositions, that is, at least one molecular composition for each of the plurality of hydrocarbon samples.

In an embodiment, the molecular compositions can be determined simultaneously for the hydrocarbon samples, which can enable very rapid processing and instantaneous presentation of data to an executive dashboard for a buyer, a seller, or both.

The determination of the molecular compositions for each of the plurality of hydrocarbon samples can produce a list of components for each of the plurality of molecular compositions.

The molecular compositions for a sample of a hydrocarbon fluid streams can be represented as mole fractions.

Other concentrations, units, of the molecular composition can be identified such as mole percents, liquid volume percents, liquid volume fractions, mass fractions, mass percents or another unit.

Additional computer instructions in the first data storage can instruct the first processor to apply a virtual tag to each of the plurality of components of the molecular compositions, forming a plurality of tagged components of the molecular composition for each hydrocarbon sample.

The virtual tag can be a number such as 1C2, 200C-3, wherein the C can suggest carbon and the subsequent number can suggest the carbon bonding, such as propane or ethane.

The virtual tag can be a color, such as BlueC4. The virtual tags can be contemplated to be one color or multiple colors per component.

The virtual tag can be an alphanumeric indicator such as K2C2, a biometric indicator, such as a fingerprint or a voice print, a bar code, or combinations of all of these items. The virtual tag can be one that another computer can identify. In an embodiment a virtual tag can be inserted into an animation of a specified facility so that the component can be traced completely through the PMS as the tagged component is processed and has none, one or more phase changes, or a partial phase change during processing.

The virtual tag can includes as part of the "tag" an identified production source. An identified production source can be a geographic location, such as Green Canyon Block 65, an arbitrary name given by a production source or equipment owner such as Troika™, a leased production field name such as Blocker Field Panola County Texas, a name of an operator of a field such as Petrobras 01, a name of an operator of a well, such as Devon, a name of a hydrocarbon producer, such as Shell Oil Company, a name of a purchaser of one of the plurality of hydrocarbon fluid streams, such as Plains All American Pipeline, or combinations of these items.

Turning now to the Figures, FIG. 1 depicts the molecular compositions for a sample of a hydrocarbon fluid streams can be represented as mole fractions.

FIG. 2 is a diagram of the system, with first processor 62, wherein the computer instructions can be located in first processor data storage 63, shown in later Figures to form tagged components.

Using the first processor 62 or possibly several processors connected in series or in parallel through one or more networks 86, 88, a process simulation model for a specified facility, and a theoretical commingled hydrocarbon fluid stream molecular composition can be determined by computer instructions.

The one or more networks can be the Internet, a satellite network, a wireless network, a local area networks, or combinations thereof To accomplish this in an embodiment, FIG. 2 shows a first processor 62 can transmit the commingled tagged components to a second processor 74 which can contain at least one process simulation model (PSM) for a specified facility 30.

The specified facility can be an offshore production platform, a subsea well hub, or similar production facility with unique equipment, temperatures, pressures, lengths of processing pipe, combinations thereof, and so on.

In an embodiment, the first processor 62 can be multiple processors connected in series as second processor 74 and third processor 75, or the processors can be connected in series or in parallel through one or more networks 86, 88, such as the Internet and a cellular network, or the Internet and a satellite network, or a local area network and the Internet.

The PSM for a specified facility 30 can be a group of computer instructions that instruct a processor to formulate a theoretical commingled hydrocarbon fluid stream molecular composition for each of the plurality of hydrocarbon samples. The PSM can have computer instructions to compute the theoretical molecular composition.

The PSM for a specified facility 30 can provide a component mass, such as 1000 pounds of propane, a component volume such as 5000 liters of butane, a component energy such as 1200 btu, or combinations thereof, for each of the plurality of tagged components of the theoretical commingled hydrocarbon fluid stream molecular composition using the mass, the volume, the energy or combinations thereof determined from the original hydrocarbon samples.

FIG. 2 further shows first processor 62 or a third processor 75 can be used to take the computed theoretical commingled molecular composition and use computer instructions to pro-rate the theoretical commingled hydrocarbon fluid stream molecular composition to an agreed upon volume, such as 300 barrels of oil, or an agreed upon mass, such as 10,000 pounds of natural gas and/or an agreed upon energy such as 200 mmbtu, between a buyer, such as Enterprise Products and a seller, such as Chevron to form the actual sales value such as $1,000,000 US for the products, or actual delivery value which can be the same number but delivered to a different party than the buyer, such as Tennessee Gas pipeline or Consumer's Power of Michigan for the plurality of components in the commingled hydrocarbon fluid stream.

This Figure further depicts hydrocarbon fluid streams 16a, 16b, 16c, 16d, which can be a crude oil, a condensate, or a natural gas.

FIG. 2 also shows that the mass, volume, energy or combinations thereof for each plurality of hydrocarbon samples 18a, 18b, 18c, 18d can be procured using a plurality of sampling devices 19a, 19b, 19c, 19d and can be detected using a meter 50, a metering station 52, a remote terminal unit with a meter 54, a virtual meter 56, or combinations thereof to collect the initial data that can be transmitted to the first processor 62.

FIG. 2 also shows that the buyer processor 80 can have buyer processor data storage 81 that can have computer instructions 95 that can instruct the buyer processor to maintain a buyer executive dashboard 94a on the buyer display 82 concerning the molecular compositions and the plurality of components for continuous monitoring and review, and can further graphically portray buyer molecular compositions of interest for instantaneous monitoring and review and transactions.

FIG. 2 shows the seller processor 83 can have seller processor data storage 84 that can have computer instructions 97 to maintain a seller executive dashboard 94b on the seller display 85, which can further be in communication with the seller processor 83. The seller executive dashboard can simultaneously display the molecular compositions and the plurality of components for continuous monitoring, review and transactions.

FIG. 2 shows that two networks 86, 88 can be used simultaneously to communicate between the first processor 62, the buyer processor 80, the seller processor 83, and the second processor 74, and the third processor 75.

In an embodiment, the buyer processor 80 can also communicate directly with the seller processor 83 to simultaneously effect custody transfer of the molecules simultaneously with the presentation of the molecular composition analysis from the PSM.

The system can allow a seller or a buyer, or both simultaneously to view or predict the location of any one of the plurality of components, as the component is processed through any part of the PSM of a specified facility and any phase change experienced by any portion of any one of the components while other calculations are simultaneously running.

Figure 3:
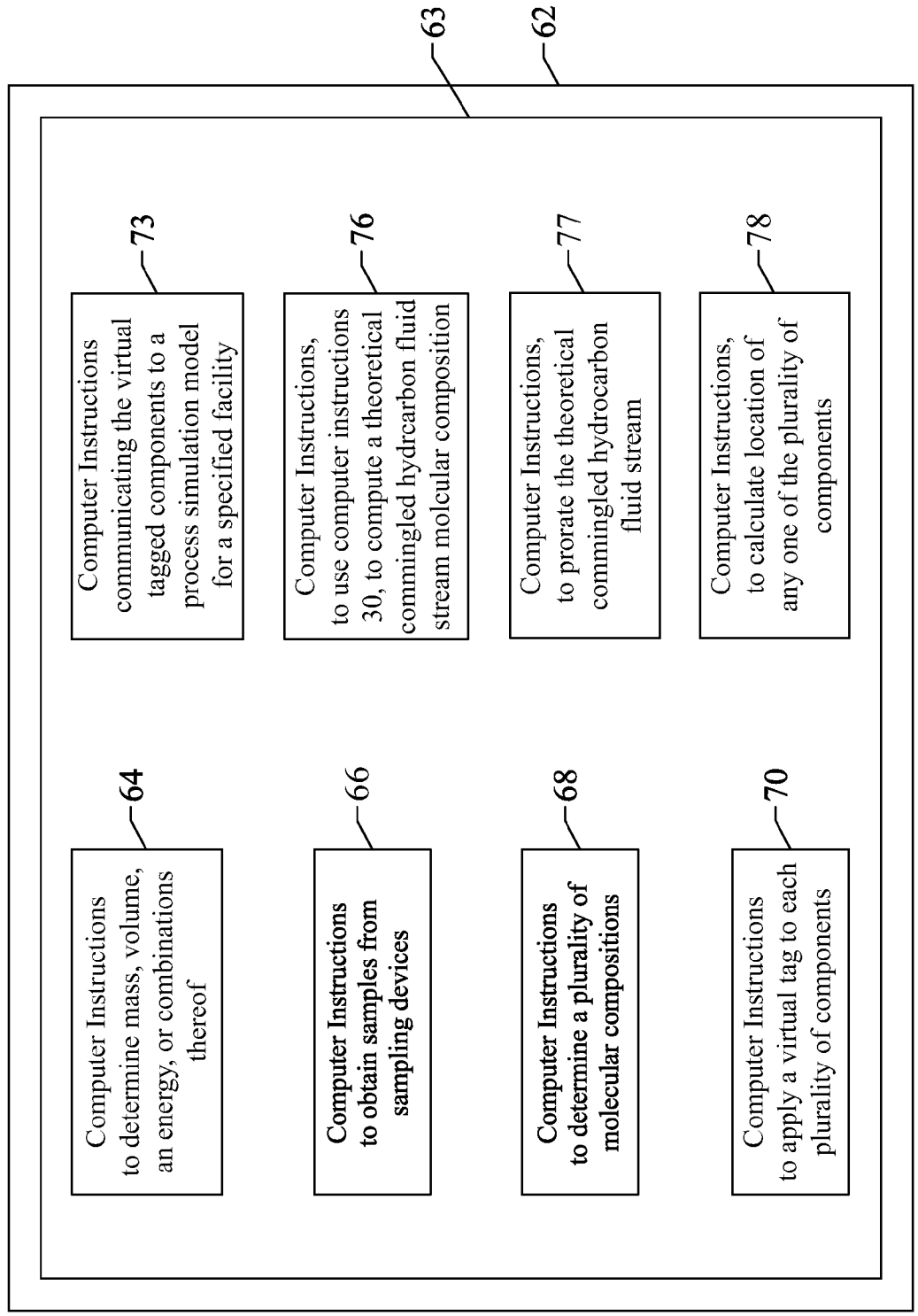
FIG. 3 is a detail of the computer instructions in the first data storage of the first processor used in an embodiment.

FIG. 3 shows a first processor 62, which can further have computer instructions located in first data storage 63, wherein computer instruction 64 can instruct the first processor 62 to determine a mass, a volume, an energy, or combination thereof for each of the plurality of hydrocarbon fluid streams.

The PSM can compute a theoretical commingled hydrocarbon fluid stream, such as component mass, component volume, component energy, or combinations therefore for each of the plurality of components of the theoretical commingled hydrocarbon fluid stream molecular composition using the mass, the volume and the energy determined using computer instructions 64.

FIG. 3 shows computer instructions 66 that can instruct the first processor 62 with first processor data storage 63 in communication with a plurality of sampling devices 19a, 19b, 19c, 19d obtaining a plurality of samples 18a, 18b, 18, 18dc to obtain a plurality of hydrocarbon samples, wherein each hydrocarbon sample is representative of each of a plurality of hydrocarbon fluid streams 16a, 16b, 16c, 16d.

FIG. 3 depicts computer instructions 68 that can determine the plurality of molecular compositions for each of the plurality of hydrocarbon samples, wherein each of the plurality of molecular compositions can comprise a plurality of components.

FIG. 3 shows computer instructions 70 that can apply a virtual tag to each of the plurality of components forming a plurality of tagged components for each hydrocarbon sample. Each tagged component can have a chemical name of the component and another element.

FIG. 3, further shows computer instructions 73, which can communicate the virtual tagged components to a process simulation model for a specified facility 30, shown in FIG. 1.

This Figure can further use the computer instructions to process simulation model for the specified facility 30, also shown in FIG. 1, to compute a theoretical commingled hydrocarbon fluid stream molecular composition 76.

The computer instructions 76 can further be used to compute a member of the group consisting of: a component mass, a component volume, component energy, or combinations thereof, for each of the plurality of components of the theoretical commingled hydrocarbon stream molecular composition using the mass, the volume, the energy or combinations thereof.

FIG. 3 shows the computer instructions 77, which can pro-rate the theoretical commingled hydrocarbon fluid stream using the theoretical commingled hydrocarbon fluid stream molecular composition with an agreed upon volume, an agreed upon mass, or an agreed upon energy or combinations thereof, between a buyer and a seller, to form the actual sales value or actual delivery value for the plurality of components in the commingled hydrocarbon fluid stream.

FIG. 3 also shows that the system can contemplate that there can be computer instructions 78 that can instruct first processor 62 to calculate the location of any one of the plurality of component, as any one of the plurality of components can be processed through any part of the specified facility, and further that calculation accommodates any phase change experienced by any portion of any one of the components.

FIG. 4 shows a theoretical commingled hydrocarbon fluid stream molecular composition for a hydrocarbon fluid stream with multiple owner hydrocarbon fluids contained therein.

FIG. 4 shows a theoretical commingled hydrocarbon fluid stream molecular composition. Which also includes the commingling of the tagged components and the quantity of tagged components.

FIG. 5 shows pro-rated actual sales values and actual delivery values for the theoretical tagged commingled stream analyzed using the system.

Figure 6:
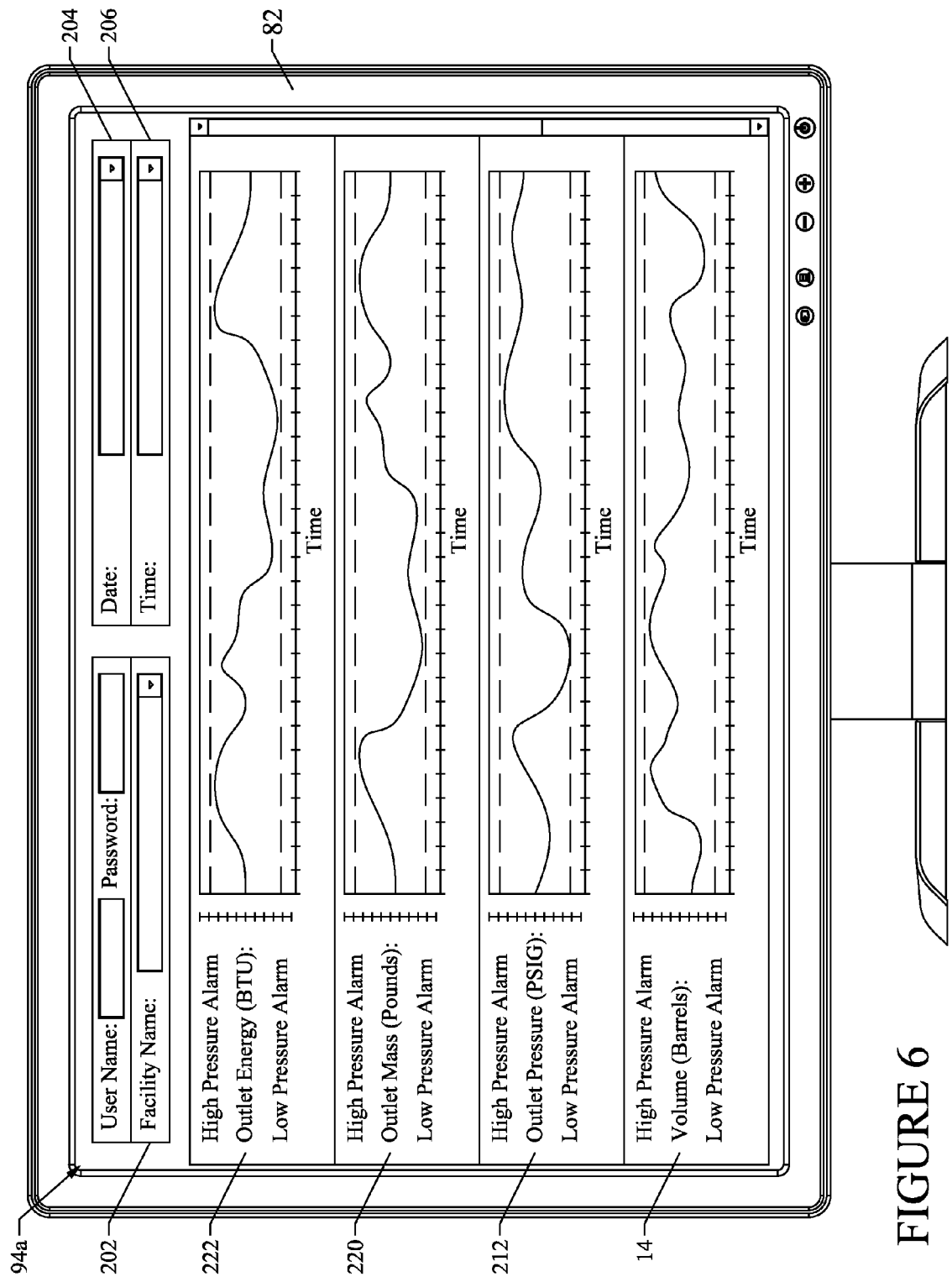
FIG. 6 is a buyer executive dashboard usable with this system
Figure 7:
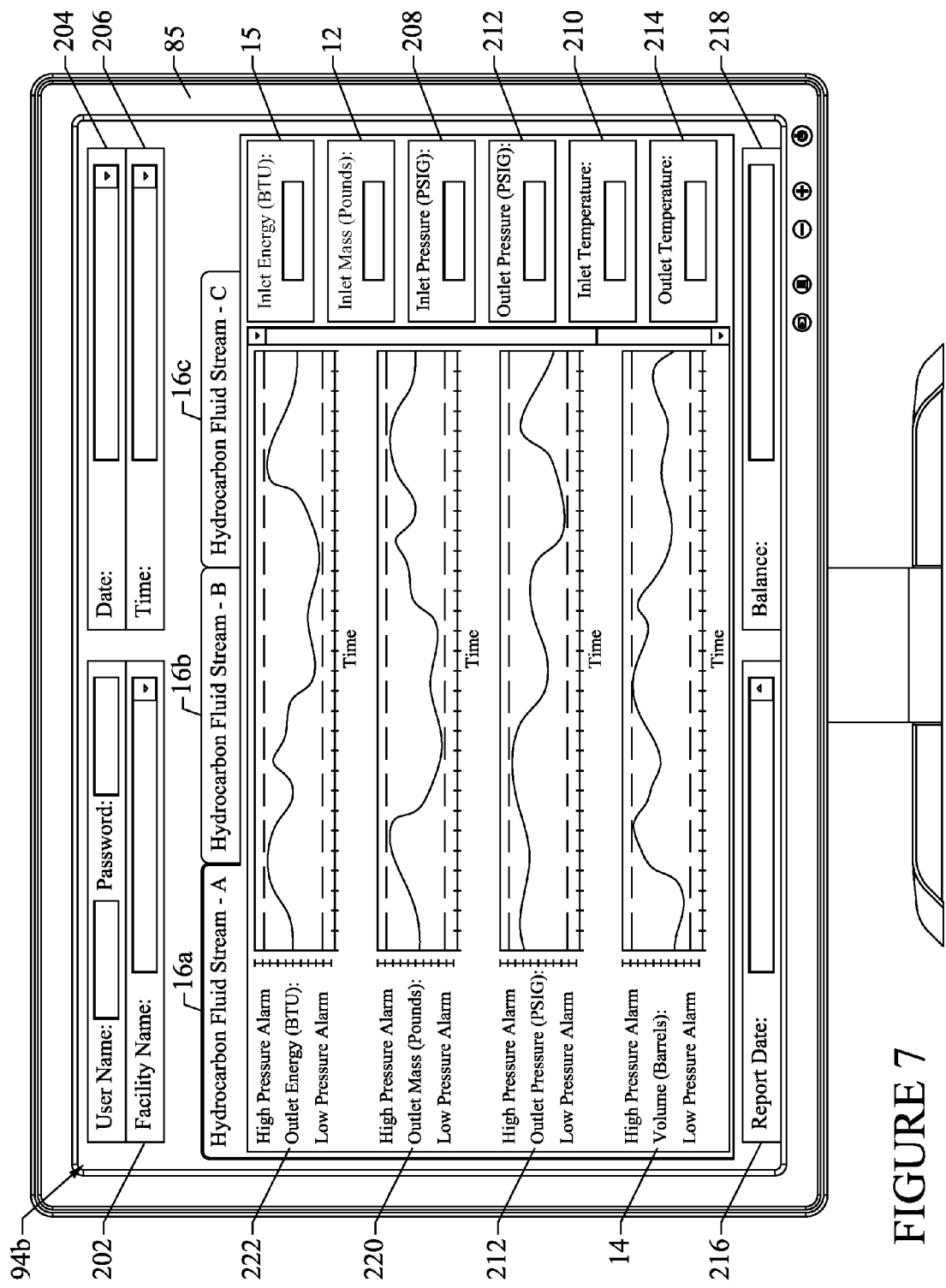
FIG. 7 is a seller executive dashboard usable with this system.

The executive dashboard for the buyer executive dashboard 94a and a seller executive dashboard 94b can include one or more of the following items with all graphical representations shown with upper and lower control limits as shown by examples in FIG. 6 and FIG. 7.

These examples can be a facility name 202: (name of a processing facility); the date 204 and time 206 (for a given reading); hydrocarbon fluid streams 16a, 16b, 16c (indicating oil, condensate, water, natural gas commodity composition); inlet and outlet volume 14 (barrels, or cubic feet either cumulative or instantaneous for a given time or range of time); inlet energy (btu) 15; outlet energy (btu) 222; inlet mass (pounds) 12; outlet mass (pounds) 220; inlet pressure 208 (psig at the inlet to the facility); inlet temperature 210; outlet pressure (psig at the outlet to the facility) 212; outlet temperature 214; report date 216; and balance 218 that is the difference between theoretical values and actual values.

FIG. 7 further depicts the seller display 85, which in this Figure is shown as a computer monitor.

The system can also contemplate that the process simulation model can have at least one phase change or a partial phase change, such as from gaseous molecules to gas condensate for at least one of the plurality of tagged components.

The system can contemplate that the plurality of hydrocarbon fluid streams can include at least one production stream, such as an offshore production stream, such as a stream from the Marco Polo production hub near Texas.

The system can contemplates that at least one of the hydrocarbon fluid streams can include a pipeline condensate or a "retrograde" condensate, such as that from Williams Southeast Lateral Pipeline located offshore Louisiana.

The process simulation model can include an equation of state in an embodiment such as a Peng Robinson or SRK or another equation of state.

The mass, energy, volume, or combinations thereof, which can be determined in this system can be computed using a meter, such as an orifice meter, made by Daniel Industries of Houston, Tex., a metering station which can have a meter and valve, actuators, meter tubes, remote terminal unit with a meter such as with RTU's made by AutoSol of League City, Tex. or Bristol Babcock, a virtual meter, such as a Multiphase Solutions, Inc. of Houston, Tex., or combinations thereof.

The system can contemplate that at least one of the plurality of molecular compositions can be analyzed using gas chromatography, distillation, pressure volume temperature analysis, infrared analysis, titration, thermal spectral analysis, or combinations thereof.

The molecules being determined by the molecular analysis for the molecular composition can include nitrogen, argon, helium, carbon dioxide, oxygen, sulfur and sulfur species, water, hydrocarbons 1 through 100 (referred to herein as "C1 through C-100 hydrocarbons"), and combinations thereof.

In an embodiment, the virtual tag can include the chemical name of the component, and another element, such as "Methane, Genghis Khan" which can indicate the molecule methane, with the name of an offshore rig "Genghis Khan" that provided the hydrocarbon fluid stream.

The system can contemplate that the virtual tag can be an alphanumeric number, a binary number, a bar code, or a color, an animation, such as an animation of the flow of fluids through a gas processing facility, a series of objects, such as a series of arrows, a biometric indicator like a retinal scan, a hexadecimal code or combinations thereof.

The system can contemplate that the specified facility can be geographically identifiable.

The system can contemplate that the actual sales value or actual delivery value can be computed when custody transfer of the commingled hydrocarbon fluid stream occurs from the seller to the buyer and money is assigned to the seller based on component volumes, component energy, or component masses for each components of the commingled hydrocarbon fluid streams.

The system can use a worldwide communication network such as the Internet to communicate between processors.

While these embodiments have been described with emphasis on the embodiments, it should be understood that within the scope of the appended claims, the embodiments might be practiced other than as specifically described herein.

What is claimed is:

1. A system for computing an actual sales value or an actual delivery value for all of a plurality of commodities of a commingled hydrocarbon fluid stream, comprising:
   a. a first processor with first processor data storage in communication with a plurality of sampling devices obtaining a plurality of samples using computer instructions to obtain a plurality of hydrocarbon samples, wherein each hydrocarbon sample is representative of each of a plurality of hydrocarbon fluid streams;
   b. a plurality of computer instructions in first processor data storage, wherein the computer instructions instruct the first processor to:
      determine a member of the group consisting of: a mass, a volume, an energy, or combinations thereof, for each of the plurality of hydrocarbon fluid streams;
      determine a plurality of molecular compositions for each of the plurality of hydrocarbon samples, wherein each of the plurality of molecular compositions comprises a plurality of components;
      apply a virtual tag to each of the plurality of components, forming a plurality of tagged components for each hydrocarbon sample;
      communicate the virtual tagged components to a process simulation model for a specified facility;
      use the process simulation model for the specified facility to compute a theoretical commingled hydrocarbon fluid stream molecular composition and compute a member of the group consisting of: a component mass, a component volume, component energy, or combinations thereof, for each of the plurality of components of the theoretical commingled hydrocarbon stream molecular composition using the mass, the volume, the energy or combinations thereof; and pro-rate the theoretical commingled hydrocarbon fluid stream using the theoretical commingled hydrocarbon fluid stream molecular composition with an agreed upon volume, an agreed upon mass, or an agreed upon energy or combinations thereof, between a buyer and a seller, to form the actual sales value or actual delivery value for the plurality of components in the commingled hydrocarbon fluid stream;

c. a buyer processor in communication with the first processor over a first network, wherein the buyer processor is in communication with buyer processor data storage with computer instructions to operate a buyer executive dashboard using information from the first processor, and d. a seller processor in communication with the first processor over the first network, wherein the seller processor is in communication with seller processor data storage with computer instructions to operate a seller executive dashboard using information from the first processor.

2. The system of claim 1, further comprising computer instructions that perform concurrently with the process simulation model calculating the location of any one of the plurality of components as any one of the plurality of components is processed through any part of the specified facility, and further wherein that calculation accommodates any phase change experienced by any portion of one of the components.

3. The system of claim 1, wherein the process simulation model comprises at least one phase change for at least one of the plurality of tagged components.

4. The system of claim 1 wherein at least one of the plurality of commodities can include a member of the group consisting of: a crude oil, a condensate, a natural gas, a liquefied natural gas, a liquefied petroleum gas, or combinations thereof.

5. The system of claim 1, wherein the plurality of hydrocarbon fluid streams include at least one production stream.

6. The system of claim 5, wherein the at least one production stream is an offshore production stream.

7. The system of claim 1, wherein the plurality of hydrocarbon fluid streams include a pipeline condensate or a "retrograde" condensate.

8. The system of claim 1, wherein virtual tag can be a number, a color, an alphanumeric indicator, an identified production source or combinations thereof.

9. The system of claim 8, wherein the identified production source comprises: a geographic location, an arbitrary name given by a production source or equipment owner, a leased production field name, a name of an operator of a field, a name of an operator of a well, a name of a hydrocarbon producer, a name of a purchaser of one of the plurality of hydrocarbon fluid streams, or combinations thereof.

10. The system of claim 1, wherein the process simulation model comprises: an equation of state.

11. The system of claim 1, wherein the mass, volume, energy, or combinations thereof, is determined using a meter, a metering station, a remote terminal unit with a meter, a virtual meter, or combinations thereof.

12. The system of claim 1, wherein at least one of the plurality of hydrocarbon samples is obtained through a continuous sampling system, a batch sampling system or another spot sampling system.

13. The system of claim 1, wherein the step for determining at least one of the plurality of molecular compositions by a member selected from the group: gas chromatography, distillation, pressure volume temperature analysis, infrared analysis, titration, thermal spectral analysis, or combinations thereof.

14. The system of claim 1, wherein the plurality of components comprise: nitrogen, argon, helium, carbon dioxide, oxygen, sulfur and sulfur species, water, C1 through C-100 hydrocarbons, and combinations thereof.

15. The system of claim 1, wherein the virtual tag comprises: a chemical name of the component and a member of the group comprising: an alphanumeric number, a binary number, a bar code, a color, an animation, a series of objects, a biometric indicator, a hexadecimal code, and combinations thereof.

16. The system of claim 1, wherein the specified facility is geographically identifiable.

17. The system of claim 1, wherein the actual sales value or actual delivery value is computed when custody transfer of the commingled hydrocarbon fluid stream occurs from the seller to the buyer and money is assigned to the seller based on component volumes or component masses for each components of the commingled hydrocarbon fluid streams.

18. The system of claim 1, wherein the network can be a worldwide communication network, a satellite network, a wireless network, a local area network, or combinations thereof.

19. The system of claim 1, further comprising:
a. computer instructions that instruct the buyer processor to maintain a buyer executive dashboard concerning the molecular compositions and the plurality of components for continuous monitoring and review; and
b. computer instructions that instruct the seller processor to maintain a seller executive dashboard concerning the molecular compositions and the plurality of components for continuous monitoring and review.

* * * * *